United States Patent [19]

Sicotte

[11] 4,410,025
[45] Oct. 18, 1983

[54] METHOD AND APPARATUS FOR MAKING WOODEN CHAIR SEATS

[75] Inventor: Jacques Sicotte, St. Thérèse, Canada

[73] Assignee: Paul Sicotte & Fils Ltee, St. Therese, Canada

[21] Appl. No.: 244,725

[22] Filed: Mar. 17, 1981

[51] Int. Cl.³ .......................... B27C 1/00; B27M 1/08
[52] U.S. Cl. ........................................ 144/365; 29/563; 408/23; 408/24; 408/26; 144/1 R; 144/35 R; 144/367
[58] Field of Search .................. 144/1 R, 3 R, 47, 367, 144/365; 29/563; 408/23, 24, 26

[56] References Cited

U.S. PATENT DOCUMENTS

| 4,243,081 | 1/1981 | Pritelli | 144/1 R |
| 4,260,001 | 4/1981 | De Muynck | 144/3 R |

FOREIGN PATENT DOCUMENTS

| 1043548 | 12/1978 | Canada | 144/3 R |
| 2722290 | 11/1978 | Fed. Rep. of Germany | 144/3 R |

*Primary Examiner*—W. D. Bray
*Attorney, Agent, or Firm*—Alan Swabey; Guy Houle; Robert Mitchell

[57] ABSTRACT

A method and a machine for automatically making wooden chair seats. A feed conveyor is provided to sequentially advance a plurality of boards in a series spaced apart manner along a plurality of separate work stations. Board positioning and holding elements are provided at each of the stations to hold the boards thereat at a precise location to effect a work function to the boards. The displacement of the boards are also synchronized together whereby they are displaced from all of the stations simultaneously. A drilling station is provided to drill holes on at least one side face of the boards. A routing station routes a pattern in a surface of the boards. A sanding station sands the routed surface and thereafter the boards are conveyed to a contour cutting station where a predetermined peripheral outline is cut in the boards. An edge sander than smoothes out the cut outline edge of the boards and a transfer device transports the boards after they have been completely machined into seats to an unloading area.

16 Claims, 6 Drawing Figures

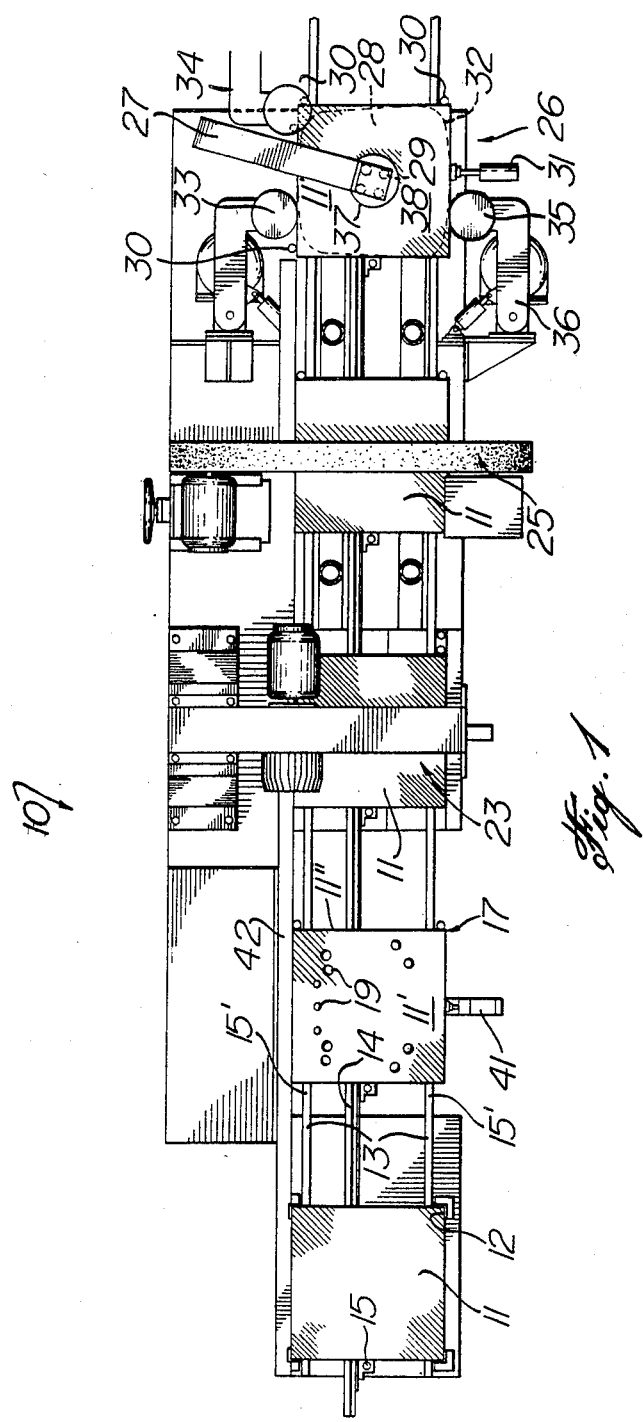

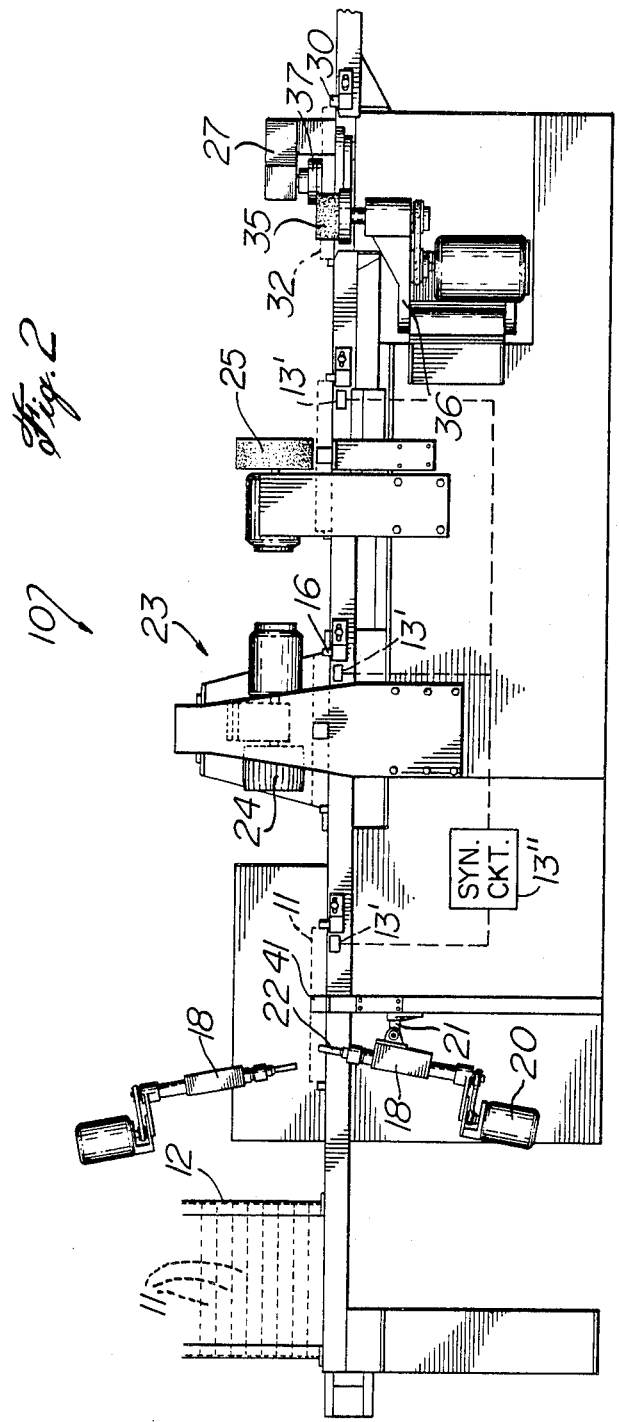

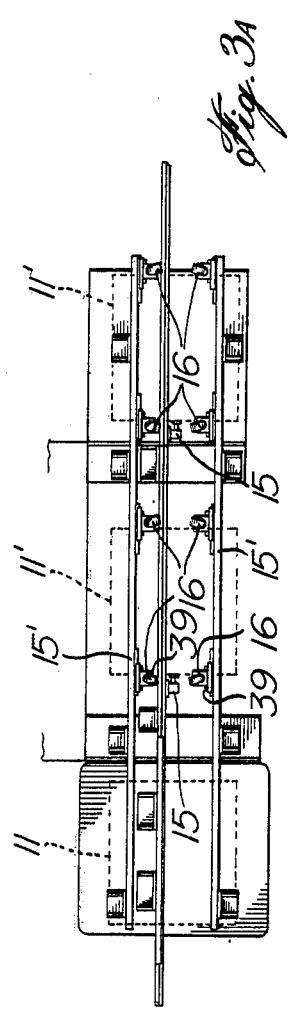
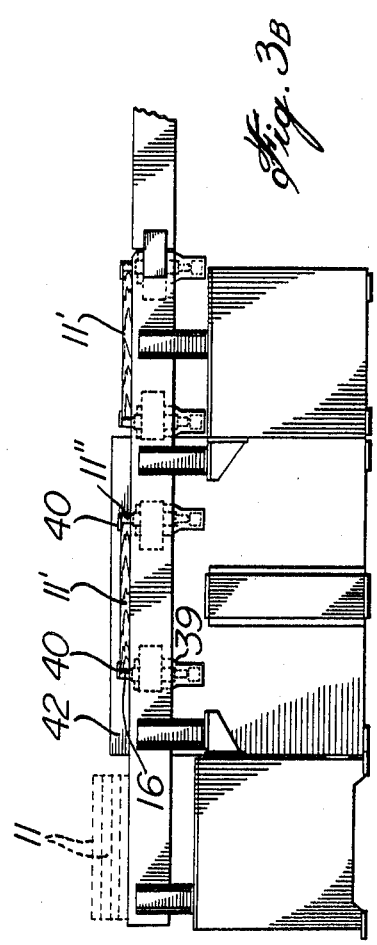

METHOD AND APPARATUS FOR MAKING WOODEN CHAIR SEATS

BACKGROUND OF INVENTION (a) Field of the Invention

The present invention relates to an improved method and machine for automatically making wooden chair seats.

(b) Description of Prior Art

Machines for making such seats are known, such as that disclosed in Canadian Pat. No. 1,043,548, issued on Dec. 5, 1978. The present invention relates to an improvement of a machine of this type whereby the production time of the machine is greatly improved. A disadvantage of known machines is that some of the work stations are provided to effect more than one working function and this is time-consuming as a further station in the machine may be in a holding pattern awaiting for the machine board to be fed thereto. Another disadvantage of these types of machine is that the board is usually contour cut in a preliminary stage of the machine and it is therefore necessary in subsequent stages to have complex positioning elements to assure that the seat is positioned properly. Therefore, when a machine is adapted to cut a seat having a different contour, it is necessary to change the positioning elements at each of the downstream stations whereby to adapt to a new seat configuration.

A still further disadvantage of the prior art machines is that by providing various work functions at a single station, that station becomes cluttered with working parts and hydraulic and pneumatic lines making it very difficult to repair the machine due to its inaccessibility to some of the parts. Furthermore, there exists a requirement to discharge the boards more efficiently whereby these are not damaged. A further disadvantage of known prior art machines is that the hydraulic and pneumatic system serves to control all work stations of the machine and this greatly increases the chances of a failure in the machine. Also, a complex switching arrangement is required with such combined system and this slows down the cycle time of the machine.

SUMMARY OF INVENTION

It is a feature of the present invention to provide an automatic machine for making wooden chair seats which substantially overcomes all of the above-mentioned disadvantages.

A further feature of the present invention is to provide a method for making wooden chair seats which is greatly improved over known prior art methods and which substantially overcomes all of the above-mentioned disadvantages.

According to a broad aspect of the present invention, there is provided an automatic machine for making wooden chair seats comprising feed means for sequentially advancing a plurality of boards in a series spaced apart manner along a plurality of separate work stations. Board positioning and holding means provided at each of these stations to hold the boards thereat at a precise location to effect a work function to the boards. Means is provided to synchronize the displacement of the boards from the stations. A drilling station drills holes on at least one side face of the boards. A routing station routes a pattern in a surface of the boards. A sanding station is provided to sand the routed surface. A contour cutting station cuts a predetermined peripheral outline in the boards and an edge sanding means is provided to sand the cut outline edge of the boards. Transfer means is also provided to transport the boards after they have been machined by the work stations into seats, to an unloading area.

According to a still further broad aspect of the present invention, there is provided a method of making wooden chair seats. The method comprises the steps of advancing, in synchronism, a plurality of boards in series to a plurality of work stations where specific work operations are automatically performed. The boards are positioned and held at each station, one at a time. Holes are drilled in at least one side face of the board at a drilling station. A pattern is routed in a surface of the boards at a routing station. The routed surface of the board is sanded at a sanding station and a contour is cut through a predetermined peripheral outline at a contour cutting station. An edge sander then sands the cut contour and the board is then transferred to an unloading area.

BRIEF DESCRIPTION OF DRAWINGS

A preferred embodiment of the present invention will now be described with reference to the example thereof illustrated in the accompanying drawings, in which:

FIG. 1 is a plan view showing the disposition of the main elements forming the work stations of the machine of the present invention;

FIG. 2 is a side view of FIG. 1;

FIG. 3A is a top view showing the construction of the feed conveyor and the location of the board positioning and holding clamps;

FIG. 3B is a side view of FIG. 3A and showing boards held in position at their work stations;

DESCRIPTION OF PREFERRED EMBODIMENTS

Figure 4:
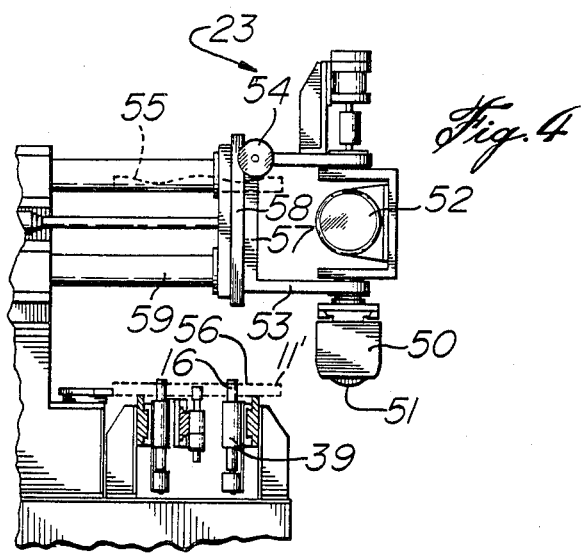
FIG. 4 is a side view showing the routing station.

Referring now to the drawings, and more particularly to FIGS. 1 and 2, there is shown generally at 10, the automatic machine of the present invention for making wooden chair seats. The machine will be described briefly from the input to output end. A plurality of wooden boards 11 are stored in juxtaposition in a magazine 12 at the input end. A feed conveyor 13 comprising a feed ramp 14 having a plurality of spaced apart pushers 15 will engage a lowermost one of the boards 11 and move it along the conveyor to the various work stations which will be described later. As herein shown, the wooden boards 11 are of a rectangular outline and guided along the feed conveyor 13 on support tracks 15'.

The pushers 15 are equidistantly spaced along the feed ramp 14 to advance individual boards in a series spaced apart manner along the various work stations down the conveyor line. At each station there is provided a board positioning and holding means to hold the boards thereat at a precise location to effect the work function to the boards. The positioning and holding means will be described later. Limit switches 13' are positioned along the feed conveyor 13 to detect the advancement of a board and to activate the positioning and holding means, herein retractable, adjustable pins 16 (see FIG. 2), whereby to engage with a leading straight edge of the board 11 entering the work station.

The switches activate a synchronizing circuit 13", but obvious to a person skilled in the art, to automatically operate each of the stations and effect various work functions in synchronism.

As shown in FIGS. 1 and 2, as the boards advance from the inlet end, they are first directed to a drilling station 17 which comprises a plurality of drills 18 which may be arranged above and below the support tracks 15 whereby to drill holes, such as those shown at 19, in the top and/or bottom surfaces of the board 11'. Each of the drills 18 have their own drive motors 20 and are secured on an adjustable frame 21 whereby the angle of the drill bit 22 may be adjusted to suit the requirements of the wooden chair seat being formed.

After the holes are drilled, the board 11' then moves on to a routing station 23 where a pattern is routed in a surface of the board, herein the top seating surface of the board. Again, the board is precisely positioned and held under a routing head 24 in the same manner as at the drilling station. After the pattern is routed in the board, the board then moves along to a sanding station 25 where the routed surface of the board is sanded. This station merely comprises a sanding drum having an outer sanding portion (not shown) and which is moved across the top surface of the board.

After the top surface of the board is sanded, the board is then advanced to a contour cutting station 26 for cutting a predetermined peripheral outline in the boards. At the cutting station 26, there is provided a cam support table 28 having a board support top surface on which the board is supported and held thereon by suction applied to suction ports 29 centrally located thereon. The suction air is applied after the board is properly localized on the table by the board positioning means which consists of the locating pins 30 and the locating piston 31.

In order to cut a specific contour in the board 11', the outer edge of the support table 28 is formed as a cam edge 32 whereby to guide a first rotating contour cutting knife 33 and a second finishing rotating knife 34 in a spaced apart manner against the outer edge of the board 11'. This is done by mounting the knives 33 and 34 on an assembly which is guided by a cam follower element (not shown) but obvious to a person skilled in the art. Also, the table 28 is rotated in a clockwise manner against the knives 33 and 34. The finishing knife 34 is only applied against the board after the board has gone through a complete rotating cycle against the roughing knife 33.

Also, at the contour cutting station 26, there may be provided a sanding element 35, herein a rotating sander, whereby to sand the cut contour edge of the board 11'. The sander frame 36 may also be mounted for reciprocation, whereby the rotational sander 35 is reciprocated against the cut edge of the board.

After the edge has been sanded, the transfer head 37 of the transfer arm 27 engages the top face 38 of the board 11' and the suction air is removed from the same support table 28 and applied to the transfer head 37. The transfer arm 27 then lifts the board vertically off the support table and rotates to discharge the board at an adjacent unloading area. A modification of the contour cutting station 26 will be described later with reference to FIG. 5.

Referring now to FIGS. 3A and 3B, there is shown the construction of the positioning and holding means utilized at the drilling station 17, the routing station 23 and the sanding station 25. They consist of the retractable piston pin 16 secured in respective piston housings 39 mounted on the support tracks 15'. The piston pins 16 have a top transverse clamp flange 40 at a top end thereof whereby to engage with a top marginal edge portion of the board 11' positioned at the station. A locating piston 41 (see FIG. 1) locates the board against a locating rail 42 after the forward edge 11" of the board 11' is in abutment against the positioning pins 16. Thereafter, the positioning pins 16 are axially rotated whereby the clamp flange 40 faces toward the top surface of the board 11' and the clamp pins are retracted downwardly to apply downward clamping pressure against the board 11' to hold it firmly in precise position on the tracks 15' whereby the work function of the station can be performed.

Referring now to FIG. 4, there is shown the construction of the routing station 23. This station consists essentially of a routing head 50 which is a drum-type knife 51 rotatably driven by a drive motor 52 and secured to a displaceable support frame 53. A cam follower member 54 is secured to the support frame 53 and it is in displaceable engagement with a cam surface 55 whereby the support frame 53 may be displaceable vertically with respect to the top surface 56 of the board 11'. As herein shown, the displaceable support frame has an engagement rear wall 57 which is in sliding engagement with a stationary wall 58 which is secured to piston rods 59 causing the frame 53 to be displaced horizontally along X-Y transverse axes. The cam element 55 is removably secured to the routing station frame whereby the pattern to be routed in the top surface 56 of the board 11' may be changed. The cam element 55 is secured to the routing station frame and is displaceable laterally with this frame to move the cutting knife 51 laterally over the top face 56 of the board 11'.

Figure 5:
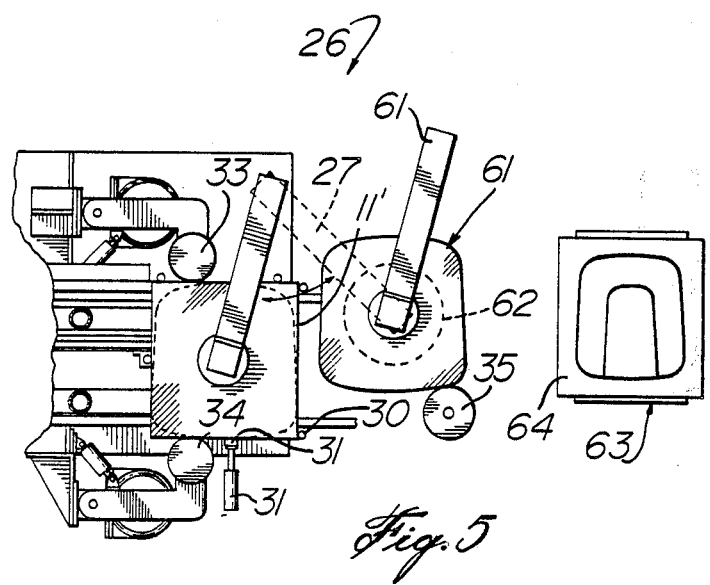
FIG. 5 is a plan view showing a modification of the edge cutting station and transfer means.

Referring now to FIG. 5, there is shown a modification of the contour cutting station 26. As herein shown, the rotational sander 35 has been positioned at a further station, and namely, a sanding station 60 whereby to minimize the work function time at the contour cutting station 26. The contour cutting station 26 would then comprise only the roughing knife 33 and finishing knife 34 whereby only two complete rotations of the board 11' would be required. It is pointed out that at this station, after the board has been positioned on the support table, the locating pins 30 and the piston head 31' are all withdrawn to make clearance to permit the board 11' to be rotated against the knives. After the contour is cut, the transfer arm 27 will then transport the cut board 11' to the sanding station 60 which may comprise of a further support table 62 having a suction port to retain the board and rotate it against the rotational sander 35. The further transfer arm 61 would then pick up and transfer the chair seat by means of suction, similar to the arrangement of transfer arm 27, and transfer the seat to an unloading station 63. The unloading station may comprise a support table 64 which is incrementally lowered as a chair seat is loaded thereon whereby the finished products are not dropped one on top of the other causing dents therein. After the unloading magazine is filled with a predetermined number of chair seats, it can be unloaded during a cycle period whereby the machine is not stopped.

It can be seen that with the present machine, it is not necessary to make extensive modifications to the machine when a different contour seat is required to be cut from the boards. Also, by having boards with a straight forward edge, the locating and clamping means need not be changed. The work functions of the stations are made relative to the straight leading edge 11" of each board and therefore even if the boards are of different sizes, they will all be processed by the machine and the excess wood is only removed in one of the final stations, namely the contour cutting station 26. By having separate working stations, it is possible to process boards more quickly and further, it provides for better access to the various parts of the stations for repair and maintenance. Also, independent pneumatic and/or hydraulic systems are provided for each of the stations whereby they may all be operated at the same time with no delay caused by sharing a main system.

It is within the ambit of the present invention to cover any obvious modifications thereof provided such modifications fall within the scope of the appended claims.

I claim:

1. An automatic machine for making wooden chair seats comprising feed means for sequentially advancing a plurality of boards in a series spaced apart manner along a plurality of separate work stations, board positioning and holding means at said stations to hold said boards thereat at a precise location to effect a work function to said boards, means to synchronize the displacement of said boards from said stations, a drilling station for drilling holes on at least one side face of said boards, a routing station for routing a pattern in a surface of said boards, a sanding station for sanding said routed surface, a contour cutting station for cutting a predetermined peripheral outline in said boards, edge sanding means for sanding the cut outlet edge of said boards, and transfer means to transport said boards after they have been machined by said work stations into seats to an unloading area.

2. A machine as claimed in claim 1 wherein said feed means comprises a support track to support said boards along a predetermined path, a plurality of pushers, each pusher advancing one of said boards along said track, said board positioning and holding means having a locating and holding element to maintain said boards at a precise location at said stations.

3. A machine as claimed in claim 1 wherein said contour cutting station comprises a cam support table having a board support surface, said board holding means being at least one suction port in said support surface, said table having a cam edge having a predetermined peripheral pattern, and cutting means displaceable by a cam follower to cut said predetermined outline in said boards.

4. A machine as claimed in claim 3 wherein said cutting means comprises a first rotating knife to effect a rough cut of said contour, and a second rotating knife to further make a finishing cut over said rough cut, each said rotating knives being secured to a respective cam follower to displace the spacing of said knife from the center of said table in accordance with the shape of said cam, and means to rotate said table to displace a board secured thereon against said knives.

5. A machine as claimed in claim 1 wherein said edge sanding means comprises a rotational sanding element positioned adjacent said table and having an abrasive outer section for engagement with said cut edge of said board, means to rotate said sanding element and means to impart a transverse reciprocable movement to said sanding element relative to the plane of said table.

6. A machine as claimed in claim 1 wherein said edge sanding means is an edge sanding station positioned adjacent said contour cutting station, rotational support means to support and rotate one of said machined boards whereby said cut edge of said board is displaced against a rotational sanding element with reciprocating displacement between said cut edge and an abrasive outer section of said sanding element.

7. A machine as claimed in claim 1 wherein said transfer means comprises a piston head having a suction face and displaceable from a position above said cam support table to engage with a cut board supported thereon after air pressure is disconnected from said suction port and transfer said cut board to said unloading area or said edge sanding station.

8. A machine as claimed in claim 1 wherein said means to synchronize the displacement of said boards from said stations comprises automatic switch means to detect the positioning of said boards at their respective stations and enable said stations to start their work function, said stations having an independent pneumatic and/or hydraulic system whereby each said operation is independent from the other and all synchronized for minimum function time.

9. A machine as claimed in claim 1 wherein said routing station comprises a routing head secured to a support frame and displaceable from above a board engaged by said holding means at said station, said board positioning and holding means comprising at least two hold down clamps each having a vertical post to locate said board and a clamp head to retain said board firmly and stationary on said feed means, said routing head being displaceable along a predetermined path along transverse planar axes and vertically by cam means to effect a routing function in a surface of said board.

10. A machine as claimed in claim 2 wherein said feed means comprises a plurality of stationary juxtaposed boards stacked at an inlet end of said support track, said pusher engaging a lowermost one of said juxtaposed boards and advancing it to a first one of said stations.

11. A machine as claimed in claim 2 wherein said boards are rectangular wooden boards having substantially parallel opposed edges, said board positioning means engaging a leading edge of said board at a predetermined reference location whereby said work functions are interrelated to one another and to said reference location.

12. A method of making wooden chair seats in which a plurality of boards in series are advanced in synchronism to a plurality of work stations where specific work operations are automatically performed comprising the steps of:
  (i) positioning and holding said boards at each station one at a time;
  (ii) drilling holes in at least one side face of said board at a drilling station;
  (iii) routing a pattern in a surface of said boards at a routing station;
  (iv) sanding said routed surface at a sanding station;
  (v) contour cutting a predetermined peripheral outline in said boards at a contour cutting station; and
  (vi) edge sanding said cut contour and transferring said machined boards to an unloading area.

13. A method as claimed in claim 12 wherein said step (vi) includes transferring said boards from said contour cutting station to an edge sanding station.

14. A method as claimed in claim 12 wherein said step (v) comprises holding said boards at said contour cutting station by applying suction air to a top surface of a support table, rotating said table to displace an outer edge of said board secured thereon against rotating cutting knives, removing said suction air after the periphery of said board is cut, and transferring said cut board.

15. A method as claimed in claim 14 wherein transferring said cut board comprises positioning a piston head over said cut board supported on said table and applying suction air to said head when said suction air is removed from said table, and displacing said piston head to transfer said cut board.

16. A method as claimed in claim 12 wherein there is provided the step of stacking a plurality of boards in juxtaposition at an inlet end of a guide track conveyor, engaging and pushing a lowermost one of said juxtaposed boards to a first one of said plurality of work stations.

* * * * *